April 19, 1938.  R. O. PETERSON  2,114,908
GREASE RETAINER WITH MOLDED HOUSING
Filed Aug. 26, 1935
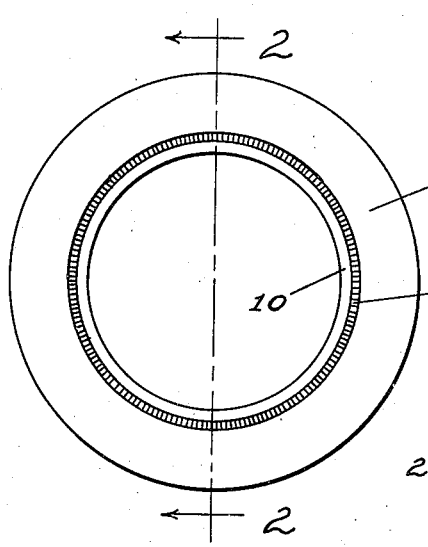
FIG. 1
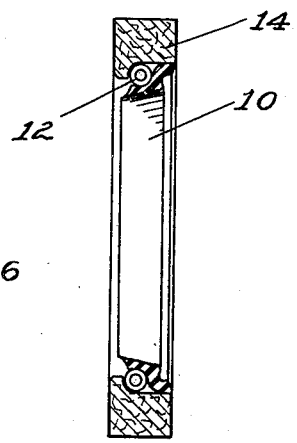
FIG. 2
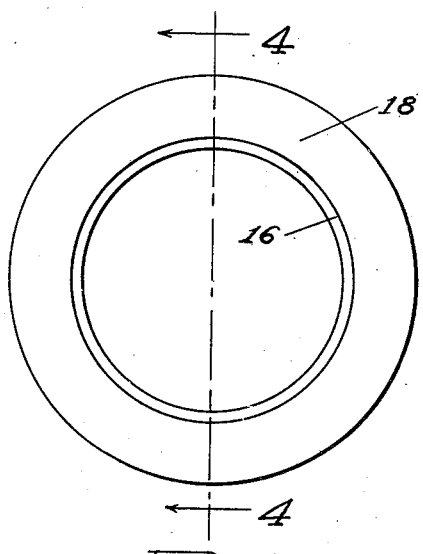
FIG. 3
FIG. 6
FIG. 4
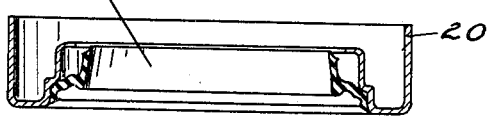
FIG. 5
RUBEN O. PETERSON
INVENTOR
PER Albert J. Fihe
ATTORNEY Patented Apr. 19, 1938

2,114,908

UNITED STATES PATENT OFFICE 2,114,908

GREASE RETAINER WITH MOLDED HOUSING

Ruben O. Peterson, Glen Ellyn, Ill., assignor to Victor Manufacturing & Gasket Company, Chicago, Ill., a corporation of Illinois Application August 26, 1935, Serial No. 37,901

2 Claims. (Cl. 288—1)

This invention relates to an improved grease retainer or oil seal for use in automobiles and the like, and has for one of its principal objects the provision of an improved oil seal which is characterized by the absence of metal in its structure except perhaps in one embodiment a metal spring.

One of the important objects of this invention is the provision of a grease retainer or oil seal which includes the usual flexible packing element, the same being composed of leather or synthetic rubber, and which is maintained in position in an axle housing and about an axle or shaft by a support for the packing or diaphragm which is composed of non-metallic material.

Another important object of the invention is the provision of a grease retainer or oil seal wherein the usual metal housing has been replaced by a part composed of some molded material such as a synthetic resin with which may or may not be incorporated a filler such as asbestos scrap or the like.

A further important object of the invention resides in the provision of an improved means whereby the flexible packing or diaphragm is fastened or otherwise attached to the molded support. Other supports such as metal may also be used.

Other and further important objects of the invention will be apparent from the disclosures in the accompanying drawing and following specification.

The invention, in a preferred form, is shown in the drawing and hereinafter more fully described.

In the drawing:

Figure 1 is a front elevation of the improved molded grease retainer made in accordance with the principles of this invention.

Figure 2 is a sectional view of the same.

Figure 3 is a front elevation of a modified form of a molded grease retainer.

Figure 4 is a sectional view taken on the line 4—4 of Figure 3.

Figure 5 shows a modification.

Figure 6 shows a further embodiment of the invention.

As shown in the drawing:

The improved molded grease retainer of this invention is composed of a minimum of parts including specifically the flexible packing or diaphragm 10 which may be of leather or some synthetic material, and this can be of different shapes or dimensions, two representative shapes being shown in Figures 2 and 4 respectively.

In the embodiment shown in Figure 2, a garter spring 12 is included whereby the flange of the packing or diaphragm is constricted about the shaft upon which the seal is mounted.

In order to properly support the diaphragm or packing element in position on a shaft, a housing or support for the same is provided in the form of a molded ring-like element illustrated at 14, this being preferably composed of some synthetic resin as a phenol condensation product or the like to which may or may not be added a filler such as asbestos scrap which further may or may not contain small particles of metal.

It has been found by experiment that these synthetic resin housings may be made slightly oversize as compared to the housing or recess into which they are to be fitted, and that inserting the same by means of a pressed or push fit will make a suitable oil seal and will at the same time properly position the device and prevent undesirable rotation.

The packing element 10 is attached to the inner face of the support or housing 14 by means of some suitable adhesive such as a synthetic resin composition or some other adhesive, as, for example, casein, and it will be noticed that the molded housing is of such shape and construction as to readily receive the packing element and also the garter spring 12 all in position for proper and efficient operation.

In Figures 3 and 4, the packing element 16 is of a slightly different shape which has been found such as to eliminate the necessity of a constricting element, and this is mounted in a synthetic housing 18 by suitable cementing or otherwise, it being noted in this instance that the housing is shaped to accommodate the exterior face of the packing element.

It will be obvious that the housings may be molded into sizes and shapes as desired both so far as accommodating any external structure and also for accommodating the packing elements of various sizes, shapes and dimensions.

As shown in Figure 5, the housing 20 may be of metal, either sheet metal formed into channel shape as shown or it may be die cast either open or solid, and the diaphragm 22 can be attached to the corresponding portion of the housing or shell by a suitable adhesive or in some other manner.

Figure 6 illustrates a form of the invention wherein the molded housing is adapted to be tightly fitted about the shaft, the packing or diaphragm being positioned on the outer face of the housing so as to contact the structure surrounding the shaft in sealing relationship therewith.

There are several objectionable points which are overcome by the novel construction presented in this application, the first being the difficulty of fixing the flexible member or diaphragm in position accurately concentric with the shaft or rotating body without destroying or lessening the effectiveness of the oil seal. In the present invention, it will be noted that the housing or holding member contains a recess which receives and centers the diaphragm. Further, this recess, which is formed by making a portion of the face of the housing of greater internal diameter than the remainder, supports the diaphragm by a radial flange which is not perpendicular to the shaft or rotating element. The flange is also so designed and the diaphragm is so constructed, attached and supported that its wiping surface is free to adapt itself to reasonable variations in the diameter and concentricity of the rotating body. Supporting the diaphragm or flexible member at the point of change of diameter eliminated those features in housings or holding members which excessively limited the adaptability of the diaphragm.

Another point of superiority of this double sleeve design is that it permits a construction which avoids opportunity for leaks through the rigid member or housing of the grease retainer or oil seal, and obviously the simplicity of construction is another favorable point.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A grease retainer, including a flexible packing element, and an annular synthetic resin support for the same, said support comprising a solid ring, a peripheral offset in the support for the retention of the packing together with means for constricting the packing element about a shaft.

2. A grease retainer, consisting of a flexible packing fashioned from sheet material held together and in shape by a plastic and having the form of a sleeve with a pronounced offset in diameter, and a housing of rigid material having a pronounced offset in internal diameter corresponding to the offset in the flexible packing, and supporting the latter from these offsets to the ends of greatest diameters but not contacting the end of the flexible packing having the lesser diameters.

RUBEN O. PETERSON.